United States Patent
Han et al.

(10) Patent No.: US 9,471,743 B1
(45) Date of Patent: Oct. 18, 2016

(54) PREDICTING PROCESS FAIL LIMITS

(71) Applicant: GLOBALFOUNDRIES INC., Grand Cayman (KY)

(72) Inventors: Geng Han, Fishkill, NY (US); Scott M. Mansfield, Vestal, NY (US); Ramya Viswanathan, Austin, TX (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 0 days.

(21) Appl. No.: 14/674,571

(22) Filed: Mar. 31, 2015

(51) Int. Cl.
*G06F 17/50* (2006.01)

(52) U.S. Cl.
CPC .................. *G06F 17/5081* (2013.01)

(58) Field of Classification Search
CPC .............. G05B 19/41875; G05B 2219/45031; G05B 2219/37224; G05B 2219/45032; G05B 23/0221; G05B 13/048; G05B 19/4184; G05B 2219/32189; G05B 2219/32222; G06F 2217/12; G06F 2217/14
USPC .................................................... 716/56, 136
See application file for complete search history.

(56) References Cited

U.S. PATENT DOCUMENTS

| | | | |
|---|---|---|---|
| 6,240,329 B1* | 5/2001 | Sun | G01R 31/2831 257/48 |
| 6,996,797 B1 | 2/2006 | Liebmann et al. | |
| 8,893,067 B2 | 11/2014 | Ye et al. | |
| 2007/0013398 A1* | 1/2007 | Rathei | G01R 31/2894 702/108 |
| 2010/0119961 A1* | 5/2010 | Ye | G03F 1/144 430/30 |
| 2014/0337810 A1 | 11/2014 | Pikus | |

* cited by examiner

*Primary Examiner* — Nghia Doan
(74) *Attorney, Agent, or Firm* — Yuanmin Cai, Esq.

(57) ABSTRACT

In an approach for predicting a process fail limit for a semiconductor manufacturing process, a computer determines a potential working process condition for each of a plurality of process parameters varied in forming a test wafer feature. The computer determines a process sigma value for each of the plurality of process parameters in forming the test wafer feature and a measurement sigma value. The computer evaluates a set of measurements of the test wafer feature compared to an acceptable wafer feature dimension, where each measurement of the set of measurements is a pass or fail as compared to the acceptable wafer feature dimension. The computer determines whether one or more fails are evaluated compared to the acceptable wafer feature dimension. The computer produces a predicted process fail limit based, at least in part, on the evaluation of fails, the measurement sigma value, and a desired target sigma value.

20 Claims, 6 Drawing Sheets

PREDICTING PROCESS FAIL LIMITS

BACKGROUND

The present invention relates generally to the field of semiconductor wafer manufacture processes, and more particularly to predicting process fail limits for multiple semiconductor manufacturing processes.

The fabrication of integrated circuits on a semiconductor wafer includes numerous process steps such as photolithography steps (in future references, "photolithography" is referred to as "lithography"). Lithography systems for lithography processing generally involve tools and processes to expose a desired pattern onto a resist layer on a semiconductor wafer, develop the resist layer, and remove the portions of the resist exposed (or, not exposed depending on the resist type). Then, following the lithography processes, further processing of the semiconductor wafer occurs, for example, by etching the underlying layer, implanting elements or depositing additional material using the developed resist layer. The processes to expose a pattern on a resist layer are commonly performed using a step and scan exposure tool such as a lithography stepper. A lithography stepper generally exposes a lithography mask or reticle by scanning a slit of fixed width from one end of the lithography mask to the other or, in some cases, by keeping the slit fixed and moving the wafer. Many multiple exposures of a mask commonly occur on a single semiconductor wafer. Lithography imaging is highly dependent on wafer surface uniformity and circuit design elements to be processed, such as component or wafer patterns such as line width, line spacing, circuit elements (e.g., microprocessors, cache, or deep trench capacitors), and the adjacent wafer features.

As integrated circuits increase in density, each successive generation of integrated circuits reduce the size of device circuit elements or device features such as lines and spaces on a semiconductor wafer. When a lithography system attempts to print circuit elements or wafer features having sizes near the wavelength of the exposing radiation, the resulting shapes of the printed circuit elements become significantly different from the corresponding pattern on the mask. For example, line width of circuit elements may vary depending on the proximity of adjacent lines causing inconsistent or different operation speeds for lines designed with the same width in a semiconductor device. For another example, line ends tend to shorten or "pullback". As the lines become smaller, this pullback becomes more significant, in some cases, causing open connections or weaker connections that are more failure prone.

Optical proximity correction (OPC) was developed to apply systematic changes to the mask to compensate for non-linear distortions caused by optical diffraction and resist process effects. OPC works by making changes to the as-designed integrated circuit layout that anticipate and correct for the distortions. Determining optimal feature types and sizes by OPC is extremely complex depending on neighboring geometries and process parameters and requires a sophisticated, complex computer program. Model-based verification or optical rules checking (ORC) is an approach in which shape checking is implemented on simulated wafer images. Although simulated wafer images of OPC enhanced layout shapes provide qualitative insight into the patterning of many layout shapes, it is extremely difficult to guarantee that all of the millions of shapes on a mask yield functional circuitry.

SUMMARY

Embodiments of the present invention disclose a method, a system, and a computer program product for predicting a process fail limit for a semiconductor manufacturing process. The method includes one or more computing devices determining a potential working process condition for each of a plurality of process parameters varied in forming a test wafer feature in a semiconductor test wafer build. The method includes one or more computing devices determining a process sigma value for each of the plurality of process parameters varied in forming the test wafer feature and a measurement sigma value from the process sigma value for each of the plurality of process parameters. Additionally, the method includes one or more computing devices evaluating a set of measurements of the test wafer feature compared to an acceptable wafer feature dimension, where each measurement of the set of measurements is evaluated as a pass or a fail as compared to the acceptable wafer feature dimension. Furthermore, the method includes one or more computing devices determining whether one or more fails are evaluated as compared to the acceptable wafer feature dimension for the set of measurements of the test wafer features for measurement sigma values below a desired target sigma value. Additionally, the method includes one or more computing devices, responsive to determining if one or more fails are evaluated, producing a predicted process fail limit based, at least in part, on the evaluated one or more fails, the measurement sigma value, and a desired target sigma value for the semiconductor test wafer build.

DETAILED DESCRIPTION

Embodiments for the present invention recognize that as semiconductor wafer designs drive for increasing density and smaller device element feature size, the minimum feature size that can be accurately reproduced on a wafer may be limited by the ability of the semiconductor wafer fabrication process to form an undistorted optical image of a mask pattern on a semiconductor wafer. The ability to form an undistorted image may be impacted, for example, by the chemical and physical interaction of the photoresist with the developer, the uniformity of preceding and subsequent processes such as etching, material deposition, or diffusion, optical diffraction, and the accuracy of the mask used to form the image. Multiple processes and the effect of nearby or underlying semiconductor wafer features all interact in a complex manner to challenge the limits of repeatable, reliable semiconductor device manufacture for semiconductor wafers.

Embodiments of the present invention provide a method, a system, and a program to predict process fail limits due to non-linearity of semiconductor wafers created by multiple semiconductor manufacturing processes. The ability to predict failure limits and to provide robust processes for multiple, interactive manufacturing process for a desired target sigma level is done using normalized or dimensionless process sigma values associated with the multiple manufacturing processes evaluated. Embodiments of the present invention provide a method for simultaneously evaluating the effect of multiple varying process parameters with different units of measurement on a range of wafer feature sizes using normalized, dimensionless sigma values and statistical analysis techniques to predict process fail limits for a desired target sigma value. Additionally, embodiments of the present invention provide a simultaneous evaluation of multiple varying process parameters to identify a set of process conditions that create wafer features without observed fails or that minimize the number of fails below the desired target sigma value. Furthermore, embodiments of the present invention provide the ability to extend multiple process evaluations for the prediction of process failure limits beyond traditional lithographic process evaluations and apply these methods to process failure predictions for non-lithographic processes such as etch processes, deposition processes or other semiconductor manufacturing processes.

Figure 1:
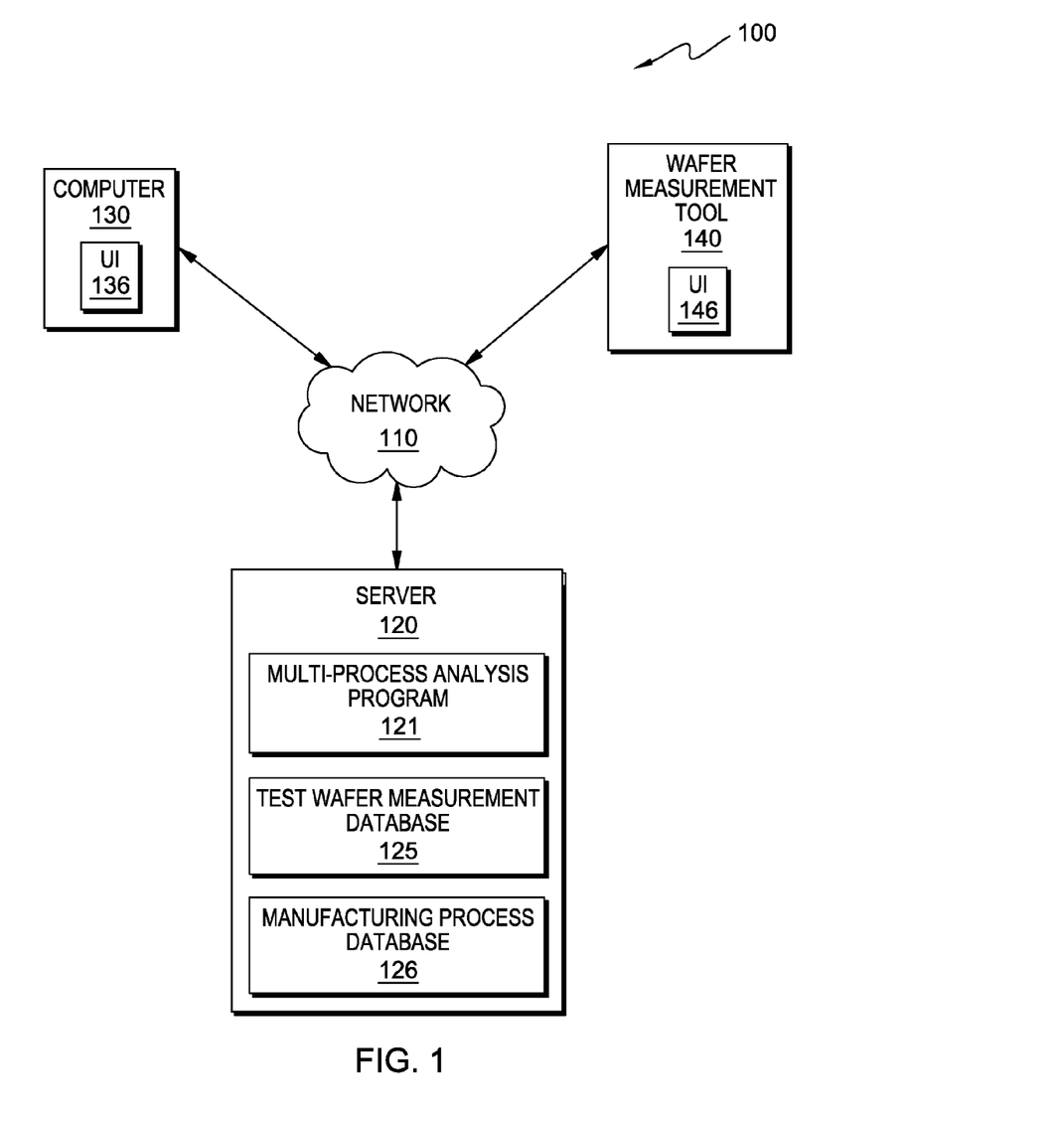
FIG. 1 is a functional block diagram illustrating a distributed data processing environment, in accordance with an embodiment of the present invention.

The present invention will now be described in detail with reference to the Figures. FIG. 1 is a functional block diagram illustrating a distributed data processing environment, generally designated 100, in accordance with one embodiment of the present invention. Distributed data processing environment 100 includes server 120, computer 130, and wafer measurement tool 140 interconnected over network 110. FIG. 1 provides only an illustration of one implementation of the present invention and does not imply any limitations with regard to the environment in which different embodiments may be implemented. Modifications to the depicted environment may be made by those skilled in the art without departing from the scope of the invention as recited by the claims.

In an exemplary embodiment, network 110 is the Internet representing a worldwide collection of networks and gateways that use Transmission Control Protocol/Internet Protocol (TCP/IP) protocols to communicate with one another. Network 110 may include a cable, a router, switches, and/or a firewall. Server 120, computer 130, and wafer measurement tool 140 are interconnected by network 110. Network 110 can be any combination of connections and protocols capable of supporting communications between server 120, computer 130, and wafer measurement tool 140. Network 110 may also be implemented as a number of different types of networks, such as an intranet, a local area network (LAN), a virtual local area network (VLAN), a wide area network (WAN), or any combination of a number of different types of networks. FIG. 1 is intended as an example, and not as an architectural limitation for the different embodiments.

Server 120 may be a web server, a server computer such as a management server, or any other electronic computing device or computing system capable of sending and receiving data. In another embodiment, server 120 represents a "cloud" of computers interconnected by one or more networks, where server 120 is a computing system utilizing clustered computers and components to act as a single pool of seamless resources when accessed through network 110. Server 120 includes multi-process analysis (MPA) program 121, test wafer measurement database 125, and manufacturing process database 126. Server 120 may include other programs or databases not shown. Server 120 sends and receives test wafer measurement data to and from wafer measurement tool 140 via network 110. Server 120 sends data such as MPA program 121 analysis data to computer 130.

MPA program 121 resides on server 120. MPA program 121 determines or predicts process fail limits in a semiconductor manufacturing line for a desired or a target process sigma level for semiconductor manufacturing processes based, at least in part, on using a statistical analysis of normalized, dimensionless process sigma values and normalized, dimensionless measurement sigma values. MPA program 121 predicts the process fail limits based, at least in part, on an analysis of the test wafer feature measurement data received from test wafer measurement database 125 and expected variation for the varying process parameters that may also be called manufacturing process variation standard deviations received from manufacturing process database 126.

Test wafers for test wafer feature measurements are built using varying process parameters. MPA program 121 determines normalized or dimensionless process sigma values for each process parameter used in manufacture of the test wafer feature being measured. MPA program 121 combines each of the process sigma values (e.g., focus, dose and mask size) using statistical methods to create a normalized or dimensionless measurement sigma for each of the test wafer feature measurements on the test wafers. MPA program 121 determines process fail limits for a target manufacturing process sigma using the normalized or dimensionless measurement sigma values in conjunction with pass/fail evaluations for each test wafer feature measurement. For example, MPA program 121 may create a plot of pass/fail evaluation results versus the measurement sigma associated with each pass/fail.

MPA program 121 can determine the test wafer measurement values and measurement sigma values where fails occur. In an embodiment, MPA program 121 sends the predicted process fail limits to a user viewing a user interface, such as UI 136, on computer 130. In some embodiments, MPA program 121 determines wafer features or wafer patterns unable to attain the target manufacturing process sigma level. MPA program 121 sends the wafer features unable to attain the target manufacturing process sigma level along with the process parameters used in the test wafer feature build to the user on UI 136 along with the associated determined predicted fail limits. MPA program 121 may send additional data to UI 136 on computer 130 such as test wafer feature measurement data plots or process distributions based on the analysis of test wafer measurement data. In an embodiment, a user interacting with UI 136 on computer 130 sends and retrieves test wafer measurement data from test wafer management database 125.

Test wafer measurement database 125 on server 120 stores test wafer measurement data sent from wafer measurement tool 140 via network 110. Test wafer measurement data includes the test wafer feature measurements, the pass/fail evaluations associated with the test wafer feature measurements, and process conditions for each process parameter used to build the test wafer feature measured. A test wafer feature measurement is a measurement of a test wafer feature or a test wafer pattern such as a line width, a space, a hard mask size, a hard mask opening, or a shape on a semiconductor test wafer. In an embodiment of the present invention, a test wafer feature measurement is a measurement of at least one of the following: line width, a space between lines, a wafer feature size, a space between wafer features, an opening in a hard mask, a width of an exposed resist, a pull-back of an exposed resist, a width of a hard mask area, or any other suitable wafer feature on a semiconductor wafer or a semiconductor test wafer. Test wafer measurement database 125 includes pass/fail evaluations for each wafer feature measurement from a test wafer. A pass/fail evaluation determines if a test wafer feature measurement meets a specified criterion such as a minimum line width or a maximum resist pullback. In various embodiments, the result of each wafer feature pass/fail evaluation is stored with the test wafer feature measurement for the test wafer in test wafer measurement database 125. Test wafer feature measurements and the associated pass/fail evaluation of the measurement are received from wafer measurement tool 140 and stored in test wafer measurement database 125. In one embodiment, test wafer measurement database 125 receives pass/fail evaluations from one or more of computer 130, another computing device (not shown in FIG. 1), manufacturing process database 126, or a manufacturing tool in the semiconductor manufacturing line.

Additionally, test wafer measurement database 125 includes the process conditions for the process parameters used to form the wafer feature measured on the test wafer. A process parameter is a parameter of a process varied in the test wafer build. For example, a process parameter for a lithography process may be the amount of defocus between the wafer exposure and the ideal best focus of the tool (i.e. focus), a mask size, or an exposure dose used to expose the photoresist (i.e., dose). A process parameter for a non-lithographic process such as wet etch may be a time, an etchant concentration, or an etchant temperature. A process condition is the process setting or level used for the process parameter in the test wafer build of a wafer feature. For example, in a lithography process, the process condition for the process parameter focus may be 15 nm and a process condition for dose may be 20 mJ. Process parameters associated with or used to build a test wafer and form a specific wafer feature are stored with the specific test wafer feature measurement in test wafer measurement database 125. In one embodiment, test wafer measurement database 125 receives process conditions for test wafer build from one or more manufacturing tools in the semiconductor manufacturing line, computer 130, or manufacturing process database 126.

Manufacturing process database 126 stores manufacturing process data including wafer feature measurement data for manufacturing wafer builds, manufacturing process conditions for process parameters associated with the manufacturing wafer build, pass/fail data for manufacturing wafer measurements, manufacturing process distributions, and other manufacturing data relevant to the semiconductor wafer build process received from one or more of several sources. Wafer feature measurement data includes any wafer feature measurement data collected by wafer measurement tool 140 or any other semiconductor device measurement tool (not shown in FIG. 1), which may collect wafer feature data such as line width or resist pullback for wafer builds for production (i.e., semiconductor devices for use in electronic devices). Wafer feature measurement data for manufacturing builds may include process characterization data used for production wafer yield improvements. In addition, manufacturing process database 126 may store data from a photomask design associated with the measured wafer features and/or photomask manufacturing process information. In an embodiment, manufacturing process database 126 receives data from one or more of the following sources: test wafer measurement tool 140, wafer test measurement data from other measurement tools (not shown in FIG. 1), process conditions from one or more manufacturing tools, process data from one or more manufacturing tools, measurement data from process tools, photomask design data, photomask manufacturing data, and engineering data and specifications from computer 130. For example, manufacturing process database 126 may receive from a user on computer 130 process specifications and product specifications for a process or a product. In another example, manufacturing process database 126 may receive from one or more manufacturing tools expected variation for the process parameters for the processes performed on the manufacturing tool determined using historical manufacturing process measurements. In an embodiment, wafer measurement tool 140 automatically compiles the expected variation for the manufacturing tool (e.g., a manufacturing tool tolerance) for each manufacturing tool and sends it to manufacturing process database 126.

Manufacturing process database 126 receives and sends data such as expected variation for the process parameters or wafer measurement data to UI 136 on computer 130. In an embodiment, manufacturing process database 126 receives data such as wafer feature measurement data for production wafers from wafer measurement tool 140. In an embodiment, manufacturing process database 126 sends and receives data such as test wafer feature measurement data from test wafer measurement database 125.

In the exemplary embodiment, computer 130 is a client to server 120. Computer 130 includes UI 136. Computer 130 sends and receives data from MPA program 121 on server 130 such as predicted process fail limits and test wafer features unable to attain desired target sigma value. Computer 130 sends and receives data from test wafer measurement database 125 and manufacturing process database 126 on UI 136 via network 110. In an embodiment, computer 130 sends instructions and receives data from wafer measurement tool 140. Computer 130 may send and receive data from other computing devices (not shown) such as manufacturing tools. In the exemplary embodiment, computer 130 is a desktop computer. In other embodiments, computer 130 may be a notebook, a laptop, a personal digital assistant, a tablet, a smart phone, wearable computing device, or other computing system connected to server 120 via network 110.

UI 136 on computer 130 provides an interface between a user of computer 130 and server 120, and enables a user of computer 130 to interact with programs and data on server 120. UI 136 may be a graphical user interface (GUI) or a web user interface (WUI) and can display text, documents, user options, application interfaces, and instructions for operation, and include the information that a program present to a user. In an embodiment, UI 136 receives a user input via a touch screen, a key board, a mouse, a display, an audio, visual or motion sensing device or other peripheral device standard in computer devices.

Wafer measurement tool 140 is a tool capable of measuring wafer features on the test wafers. For example, wafer measurement tool 140 measures the width of hard mask openings (HMO) on one or more test wafers and sends the test wafer HMO measurements to test wafer measurement database 125 via network 110. In an embodiment, wafer measurement tool 140 is a scanning electron microscope (SEM). In other embodiments, test wafer measurement tool 140 is another measurement tool such as a transmission electron microscope. In an embodiment, wafer measurement tool 140 measures other wafer characteristics. For example, wafer measurement tool 140 may be an energy-dispersive X-ray (EDX) analysis tool measuring the depth profile of various elements in a wafer. In addition, wafer measurement tool 140 can be used to measure wafer features from manufacturing production wafers and subsequently, send production wafer feature measurement data to manufacturing process database 126.

In various embodiments, wafer measurement tool 140 determines pass/fail evaluations of the test wafer measurement. One or more of the following sources for pass/fail criteria may determine pass/fail evaluations for test wafer measurements: a process specification, an engineering specification, process characterizations, a product specification, an industry specification, or a received engineer or user input for desired acceptable wafer feature size. In various embodiments, MPA program 121 is configured to use the product specification for the wafer technology used to build the test wafers. For example, if a 22 nm technology is used to build the test wafer, the 22 nm product specification is used. In an embodiment, a user operating UI 146 selects the source for pass/fail evaluation using a pull-down menu that includes an option for the user to type in the desired acceptable wafer feature size. For example, a user on UI 146 identifies an acceptable wafer feature size or dimension for a wafer feature, such as a required or acceptable minimum spacing from a specific process specification. Wafer measurement tool 140 then compares a required minimum space provided in the selected process specification to a measured minimum space between test wafer features to determine if the wafer feature measurement passes or fails.

Wafer measurement tool 140 includes UI 146. UI 146 displays data and receives a user input via a touch screen, a key board, a display, a mouse, an audio, visual or motion sensing device or other peripheral device standard in computer devices. Wafer measurement tool 140 sends and receives data to server 120 via network 110. Wafer measurement tool 140 may send and receive data from computer 130 via network 110. In the exemplary embodiment, wafer measurement tool 140 receives from manufacturing tools (not shown in FIG. 1) test wafer process conditions for the process parameters used in test wafer manufacture. In an embodiment, wafer measurement tool 140 receives from a user on computer 130 the process conditions and the process parameters used in building the test wafer. Wafer measurement tool 140 stores the process conditions and process parameters used in forming the wafer feature measured with the wafer feature measurement from the test wafer. In the exemplary embodiment, wafer measurement tool 140 sends the process conditions and process parameters used in forming the wafer feature measured with the wafer feature measurement to test wafer measurement database 125 on server 120. In one embodiment, a user on computer 130 sends the process conditions and the process parameters for the wafer feature measurement to test wafer measurement database 125.

Figure 2:
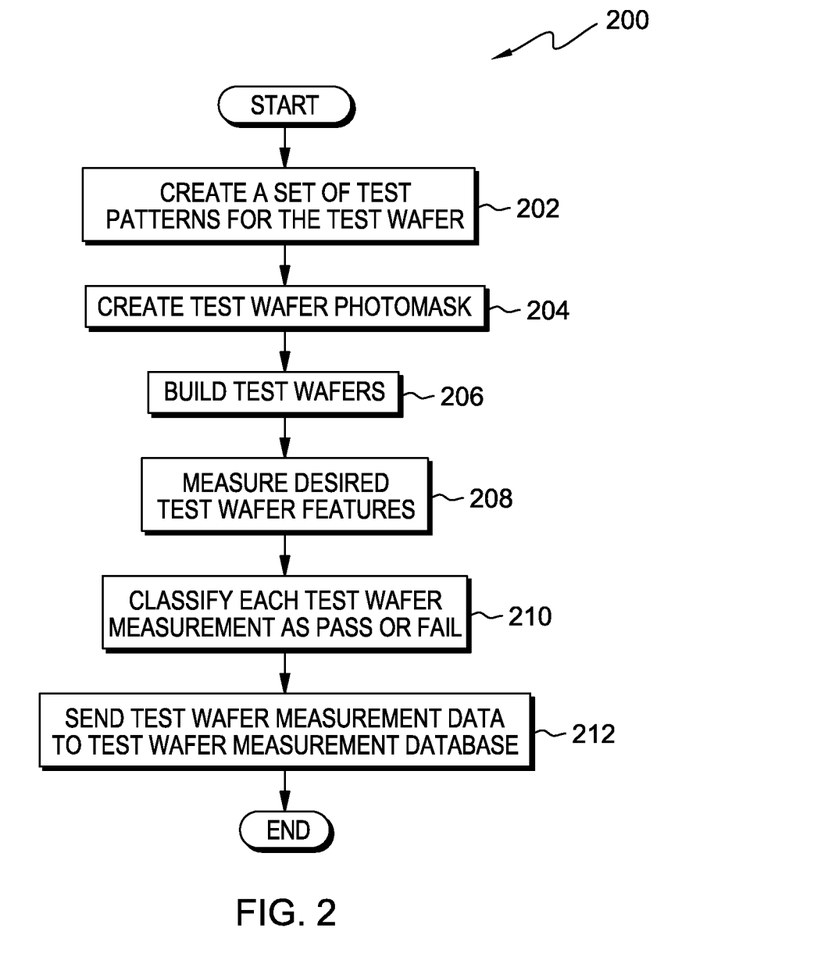
FIG. 2 is a flowchart illustrating a test wafer data collection process in accordance with an embodiment of the present invention.

FIG. 2 is a flowchart 200 illustrating a test wafer data collection process in accordance with an embodiment of the present invention. As depicted, FIG. 2 is a flow chart depicting the steps of the test wafer data collection portion of the various embodiments of the present invention. First, create a set of test pattern designs for the test wafer (202). The set, including one or more test pattern designs, may be generated as a part of the test wafer photomask design. In other words, the test wafer photomask design is composed of a number of test pattern designs or a set of one or more test patterns. The test pattern designs may include a range of pattern or wafer feature dimensions and mask design considerations. A set of test pattern designs spanning the desired design space e.g., a desired range of wafer feature sizes, OPC correction factors, and mask size are integrated in the photomask design. In one embodiment, a design program (not shown in FIG. 1) on computer 130 programmatically creates one or more test pattern designs for test photomask. In an embodiment, the test pattern designs have varying wafer feature sizes. For example, the test pattern lines may vary in width (e.g., 40 nm lines, 42 nm lines and 44 nm lines). In another example, the test pattern design provides various line/space dimensions for a single line-to-line pitch (e.g., an 80 nm line to line pitch may be formed with 40 nm lines with a 40 nm space, 42 nm lines with a 38 nm space, and 44 nm lines with a 36 nm space). In an embodiment, test pattern designs includes patterns designed to examine the effect of various mask errors on test wafer photomask sizes, such patterns referred to henceforth as mask error enhancement factor (MEEF) macros. In one embodiment, a semiconductor wafer designer on computer 130 designs one or more sets of test pattern designs using a design program (not shown on FIG. 1).

Additionally, in various embodiments, test photomask design includes different optical proximity corrections (OPC) applied to test pattern designs for the test wafer photomask. For example, different OPC corrections may include applying one or more different algorithms, running OPC at different doses, or applying mask biases to post OPC dimensions. In the exemplary embodiment, a user such as a semiconductor designer or process engineer using UI 136 specifies the range of feature sizes, OPC and mask conditions applied in a design program on computer 130 for the test photomask design.

The next step in the test wafer data collection process is to create a test wafer photomask (204). The test wafer photomask is created using the test photomask design, and can be formed by conventional mask processes such as an electron beam. The test wafer photomask created for test wafer build provides a broad range of test patterns, different OPC corrections, and various mask size ranges. The photomask manufacturing process can have both systematic and random variations at different locations on the photomask. These variations may be characterized by direct measurements of the photomask patterns that correspond to patterns to be measured on the wafer or by measurements of test patterns designed for characterizing the test mask size control. In an embodiment, more than one test mask is designed.

The test wafer data collection process then includes building test wafers (206). Using the test wafer photomask and a wide range of varying process conditions in a wafer manufacture line, one or more test wafers are built. The wide range of process conditions include process conditions for the process parameters that span a larger process variation than are typically applied in the manufacturing process. In an embodiment, one or more test wafers are built using process conditions that span a range sufficient to capture the entire range of process conditions that are expected to occur in the manufacturing process. For example, if the process parameter is characterized in a manufacturing line and found to have a normal distribution of values with a standard deviation value of sigma (i.e., an expected variation for the process), then the range of process conditions for the test wafers may span a range of −3x sigma to +3x sigma and, thereby, capture 99.7% of the expected occurrences for that process parameter. In this example, test wafers may be exposed with a focus/expose matrix (FEM) using focus variations that are +/−3x sigmaF, +/−2x sigmaF and +/−1x sigmaF from a center focus value and dose variations that are +/−3x sigmaD, +/−2x sigmaD and +/−1x sigmaD from a center dose value, where sigmaF is the standard deviation of the manufacturing focus variation (e.g., the expected variation for the process parameter) and sigmaD is the standard deviation of the manufacturing dose variation or the expected variation for the process parameter.

In other embodiments, one or more test wafers use one or more non-lithographic processes to vary process parameters in test wafer build. For example, non-lithographic processes may be etch (wet or dry), implantation or deposit (sputter or epitaxy). The materials deposited may be conductive such as metals, semiconductor, or dielectric materials as used in semiconductor device manufacturing. In an embodiment, the test wafer build uses one or more of the following varying lithographic process parameters in test wafer manufacture: focus, dose, mask size, source, or other suitable lithographic process parameter. In various embodiments, the manufacturing process tools send the process conditions for the process parameters used to form the test wafer features to wafer measurement tool 140. In one embodiment, a user on UI 136 inputs the process parameters variations sent to the manufacturing line for the test wafer build.

The test wafer data collection process includes measurement of desired test wafer features (208). For example, a measurement of a feature may be a line width measurement or a measurement of resist pullback on a line. As previously discussed, in various embodiments, wafer measurement tool 140 performs test wafer feature measurement. In an embodiment, a pattern or a wafer feature is on more than one design layer of the semiconductor wafer. As known to one skilled in the art, some wafer features may be on multiple layers of a wafer. For example, wafer features such as trenches, deep trench capacitors, resistors or other multilayer structures may be measured.

The test wafer data collection process classifies each test wafer measurement as pass or fail (210). Pass/fail evaluations of wafer feature measurements for the test wafer may be done for any criteria used in the manufacture of a functioning semiconductor device. As previously discussed, in an embodiment, wafer measurement tool 140 determines pass/fail evaluations for test wafer measurements using a product specification for the source of the criteria determining a pass or a fail of a wafer feature measurement on the test wafer. For example, to insure a continuous and reliable semiconductor line in a 22 nm generation CMOS product, the pass/fail criteria may require a minimum line width of 25 nm. In this example, a line with a measured 20 nm width is a "fail" for a 22 nm generation CMOS product.

In another embodiment, wafer measurement tool 140 receives a specification for the criteria determining a pass or a fail of a wafer feature measurement on the test wafer from a user or process engineer via UI 136 on computer 130. In one embodiment, wafer measurement tool 140 receives from a user via UI 146 the criteria to use for determining a pass or a fail for a wafer feature measurement on a test wafer. As previously discussed, the source of pass/fail evaluations criteria may be another source such as a process specification in other embodiments.

The test wafer data collection process then includes sending test wafer measurement data to a database, such as test wafer measurement database 125 (212). The test wafer measurement data including test wafer feature measurements, pass/fail evaluations for each wafer feature measurement on the test wafer, and the process conditions used for the process parameters in forming the test wafer feature are sent from wafer measurement tool 140 to test wafer measurement database 125 thus, completing the steps of test wafer data collection process.

Figure 3:
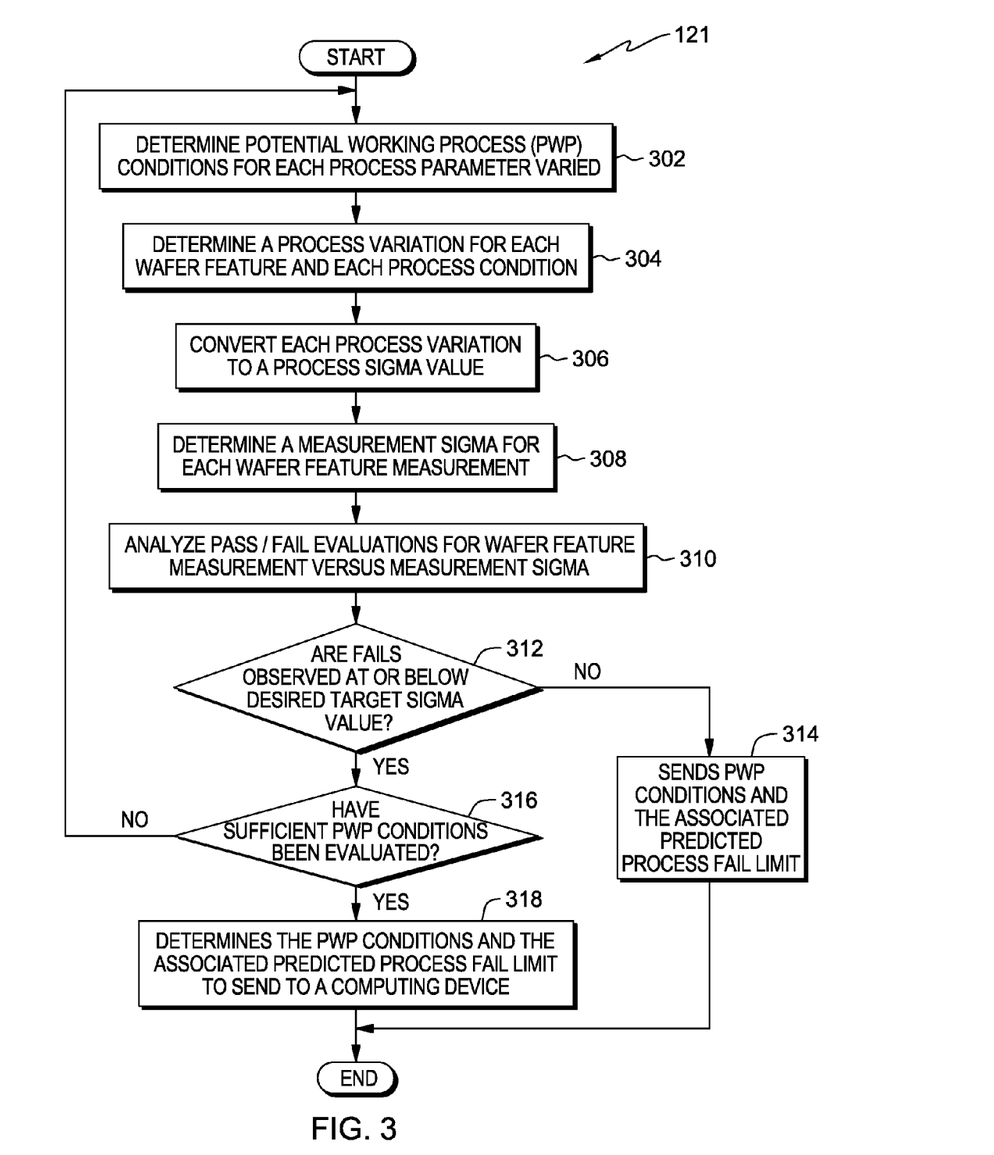
FIG. 3 is a flowchart depicting operational steps of a multiple process analysis program, on a server computer within the distributed data processing environment of FIG. 1, to predict process fail limits for multiple processes in semiconductor manufacture, in accordance with an embodiment of the present invention.

FIG. 3 is a flowchart 121 depicting operational steps of MPA program 121, on server 120 within the distributed data processing environment of FIG. 1, to predict process fail limits for multiple processes in semiconductor manufacture, in accordance with an embodiment of the present invention.

MPA program 121 determines potential optimum process conditions or the potential working conditions for each process parameter varied (step 302). Potential working process (PWP) conditions may be a set of process conditions for the multiple, varied process parameters that can result in working process conditions or a set of working process conditions for each varied process parameters as determined by MPA program 121. A working process condition for each of the varied process parameters may be a process condition of a set of working process conditions providing the best or desired manufacturing outcome (e.g., the process condition(s), which may produce no evaluated fails or in some cases, with the fails evaluated closest to and above the desired target sigma). The working process condition for each of the varied process parameters may be used as the manufacturing process condition for wafer builds. The working condition selected of the potential working conditions may be an optimum process condition when evaluated with each of the varied process parameters (e.g., may be the process condition with the best outcome or optimal outcome such as no fails below the desired target sigma value as determined by the test wafer evaluation). MPA program 121 is configured with a desired target sigma value used to determine the best or desired manufacturing outcome. In an embodiment, using a test wafer designed and built as previously discussed with reference to FIG. 2, MPA program 121 determines optimum working conditions as the process conditions attaining the desired target sigma value without any wafer failures for the desired wafer features on the test wafer. In some cases, the working conditions may be the optimum process conditions. In various embodiments, MPA program 121 determines the PWP conditions from an engineering process specification retrieved from manufacturing process database 126. In one embodiment, MPA program 121 receives historical manufacturing data from manufacturing process database 126 to determine a potential working process condition. In another embodiment, MPA program 121 receives the PWP conditions from a user via UI 136. For example, the user may use historical manufacturing data to determine a process condition in the center of the process distribution received from manufacturing process database 126 to determine a PWP condition for the process parameter. In another example, the user, via UI 136, assigns a PWP condition randomly or using engineering judgment. The user operating computer 130 sends the PWP conditions to MPA program 121 via network 110. In an embodiment, MPA program 121 selects PWP conditions. For example, MPA program 121 may randomly select the PWP conditions or MPA program 121 may select a PWP condition as the central or median process condition in a range of process conditions for each of the process parameters.

MPA program 121 determines a process variation for each wafer feature measured and each process condition (step 304). The process variation is a measure of how far the evaluated process condition (i.e., the process condition used to form the test wafer feature of interest) for a process parameter is from the PWP condition (e.g., the PWP condition for the process parameter for the evaluated process parameter). The process variation may be determined for each wafer feature and each process condition of the varied process parameters on the test wafer. The process variation is determined by subtracting the PWP condition for the process parameter from the process condition used for forming the wafer feature on the test wafer. For example, a 25 nm line on the test wafer is formed using a dose of 17 mJ, the PWP condition determined by MPA program 121 for dose on a 30 nm line is 20 mJ, and the resulting process variation for dose, in this case, is −3 mJ (i.e., 17 mJ process condition minus 20 mJ PWP condition.)

MPA program 121 converts each process variation into a process sigma value (step 306). For each measured wafer feature on the test wafer and each process condition in the test wafer build for the varied process parameters such as lithography process parameters of focus, mask size or dose, MPA program 121 determines a process sigma value that is a normalized, dimensionless value or number. MPA program 121 determines a process sigma value for every process condition tested and every PWP condition. In an embodiment, MPA program 121 stores the determined process sigma with the associated wafer feature measurement and wafer feature measurement pass/fail evaluation in test wafer measurement database 125. In the exemplary embodiment, MPA program 121 determines a normalized process sigma by dividing the process variation by the expected variation (e.g., the manufacturing process variation standard deviation value) for the process parameter.

In the exemplary embodiment, for each process parameter of the plurality of process parameters that varies (e.g., focus, dose, and mask size which are deviations from desired mask size), MPA program 121 retrieves from manufacturing process database 126 a manufacturing process variation standard deviation value, also referred to as the expected variation for the process for the process parameter. In an embodiment, MPA program 121 retrieves the expected variation from one of the following sources: a database on server 120, computer 130, wafer measurement tool 140, one or more manufacturing process tools, an engineering process characterization stored on another computing device, a process specification, a product specification, or as sent to MPA program 121 by a user from UI 136 on computer 130. The expected variation for the process parameter may be determined based on data such as by one or more of experimental process characterizations, manufacturing process historical data analysis, engineering evaluations, and manufacturing tool capabilities.

Figure 4:
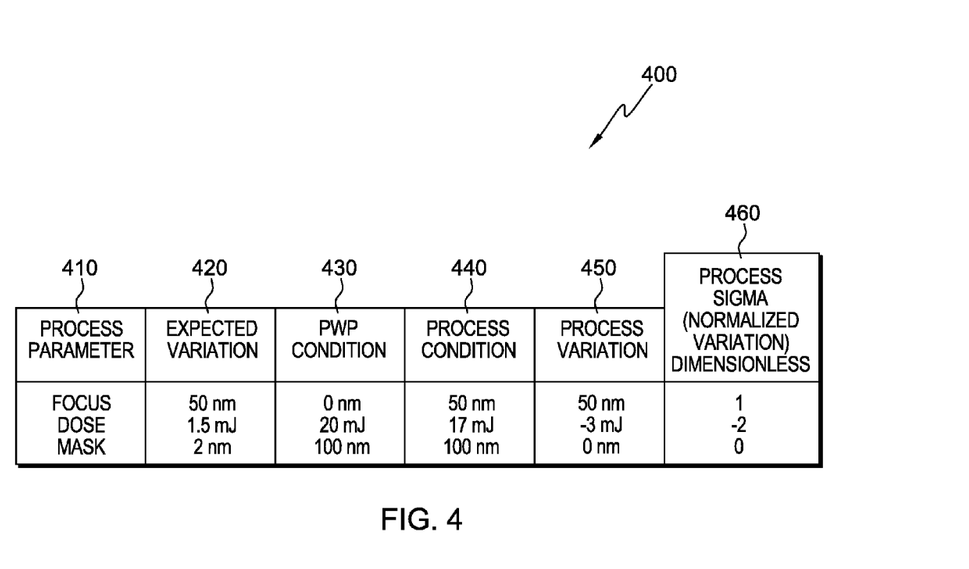
FIG. 4 illustrates an example of a table used in the calculation of a normalized process sigma as determined by the multiple process analysis program of FIG. 3, in accordance with an embodiment of the present invention.

Continuing with the example above, MPA program 121 determines the process variation for dose used in forming a 30 nm line as −3 mJ. MPA program 121 retrieves from manufacturing process database 126 an expected variation for the process parameter such as a manufacturing process variation standard deviation value for dose as 1.5 mJ, therefore the resulting process sigma value is 2.0 (no units or dimensions) for the process condition to print the 30 nm line (i.e. 17 mJ). The resulting process sigma value is a normalized variation or a dimensionless "sigma" value. FIG. 4, discussed later, depicts some examples of converting a process variation into a process sigma value for a process parameter using expected variation or a manufacturing process variation standard deviation value.

Since fail limit predictions commonly occur in advance of a new technology (e.g., a semiconductor device technology or a new manufacturing line technology such as a new 10 nm semiconductor technology), adjustments to the expected variation for the process parameter may need to take into account new tooling or planned manufacturing line process improvements. In an embodiment, MPA program 121 receives from a user via UI 136 an expected variation for a process parameter. For example, a manufacturing tool currently has a 50 nm focus expected variation for the process parameter of focus; however, a new control mechanism with a projected ten percent improvement is planned for implementation. Therefore, the user calculates an expected variation of 45 nm, which is sent to MPA program 121 for use with evaluations of test wafer data in anticipation of the new control mechanism.

MPA program 121 determines a measurement sigma for each wafer feature measurement (step 308). The measurement sigma for each wafer feature measured is for the specific set of process conditions used to manufacture the wafer feature. In an embodiment, MPA program 121 determines a measurement sigma that combines each of the normalized process sigma values of the process parameters varied in building or forming the test wafer feature. In the exemplary embodiment, MPA program 121 combines multiple normalized process sigma values (dimensionless) using statistical analysis techniques to determine a measurement sigma for the wafer feature measured on the test wafer. MPA program 121 may use any appropriate statistical analysis technique. In one embodiment, MPA program 121 uses root sum square statistical analysis to combine the multiple normalized process sigma values for a measurement sigma. In another embodiment, MPA program 121 uses an equal-probability statistical analysis technique to combine multiple normalized process sigma values to determine the measurement sigma. In various embodiments, MPA program 121 sends the measurement sigma to test wafer measurement database 125 to be stored with the associated wafer measurement.

MPA program 121 analyzes pass/fail evaluations for wafer feature measurements versus measurement sigma (step 310). MPA program 121 analyzes pass/fail evaluations determined in the test wafer data collection process as discussed in FIG. 2 and retrieved from test wafer measurement database 125. In an embodiment, MPA program 121 provides a plot of wafer measurement pass/fail evaluations versus the measurement sigma for the test wafer measurement. For example, as depicted and discussed later in FIG. 5, a plot of a wafer feature measurements in nm may be plotted on the Y-axis and the measurement sigma for each wafer measurement on the X-axis. The pass/fail evaluations for each wafer feature measurement may be plotted according to the wafer feature measurement and the associated measurement sigma for the wafer measurement. In the exemplary embodiment, MPA program 121 compares a desired target sigma value to the measurement sigma value for analysis of pass/fail evaluations to predict process fail limits. In various embodiments, MPA program 121 retrieves from test wafer measurement database 125 the wafer feature measurement, the pass/fail evaluation of the wafer feature measurement, and the measurement sigma for the wafer feature measurement to perform the analysis.

MPA program 121 determines whether fails are observed at or below a desired target sigma value (decision block 312). MPA program 121 compares the measurement sigma to the desired target sigma value and identifies if one or more fails are evaluated or observed associated with wafer measurements for measurement sigma values equal to or below the desired target sigma value. When no fails occur for a measurement sigma value equal to or less than the desired target sigma value (decision block 312, "no" branch), MPA program 121 sends the PWP conditions and the associated predicted process fail limit (step 314). MPA program 121 sends the PWP conditions and the associated predicted process fail limit to a computing device, for example, to computer 130, and the program ends processing. The predicted process fail limit is the wafer feature size for the test wafer feature associated with the PWP conditions forming the wafer feature without observed fails for the measurement sigma values below the desired target sigma value. The predicted fail limit is based on the wafer feature size. The wafer feature size may be the appropriate smallest or largest wafer features size without evaluated fails depending on the type of wafer feature being evaluated. MPA program 121 sends the PWP conditions used to determine the measurement sigma value with no fails observed for the wafer measurements at or below the desired target sigma. The PWP conditions producing no fails for wafer measurements at or below the desired target sigma become optimum process conditions in one embodiment of the present invention.

The appropriate smallest or largest wafer feature size is used as the process fail limit where the appropriate wafer feature size, as known to one skilled in the art, depends on the wafer feature of interest. For example, for a line width, the appropriate wafer feature size may be the smallest line width for the process fail limit.

In one embodiment, using the analysis of observed fails for the wafer feature measurements with respect to the associated measurement sigma value, MPA program 121 determines the wafer feature sizes with no fails observed for measurement sigma values equal to or below the desired target sigma value with a range of uncertainty around the target sigma value. The smallest wafer feature size evaluated as passing with a measurement sigma value at or below the desired target sigma value, the smallest probable passing feature (SPPF), may be proposed as the process fail limit for the PWP conditions used to form the test wafer features measured with the SPPF. In another embodiment, MPA program 121 is configured by a user to include a region or range of uncertainty (e.g., a guard band) around the target sigma value. In this case, the range of uncertainty around the target may be configured as (target sigma value–a negative sigma range)<region of uncertainty around the target sigma value<(target sigma value+a positive sigma range). The level of risk associated with the uncertainty range may be determined by a size of the negative and the positive sigma range and the skew of the range (i.e., the size of the negative sigma range as compared to the positive sigma range). For example, the SPPF can be used in conjunction with the largest wafer feature size that fails with a measurement sigma value within the region of uncertainty around the target sigma value to set the proposed fail limit. If the largest wafer feature size that fails has a measurement value less than the SPPF, then the proposed fail limit may be set in the range between the SPPF and largest wafer feature size that fails measurement values. MPA program 121 sends the proposed fail limit as determined with a range of uncertainty and the assumptions for the range of uncertainty (e.g., the negative sigma range used and the positive sigma range used) to the user on computer 130.

However, if MPA program 121 determines fails are observed at or below the desired target sigma (decision block 312, "yes" branch), then MPA program 121 determines if sufficient evaluations of other PWP conditions occurred (decision block 316). In the exemplary embodiment, MPA program 121 is configured to repeat the evaluation with another PWP condition until either a PWP condition is found without an evaluated fail for the wafer feature for the measurement sigma values below the desired target sigma or until all possible PWP conditions are evaluated. In one embodiment, MPA program 121 is configured to evaluate a set number of PWP conditions. For example, MPA program 121 may be configured to evaluate two hundred PWP conditions. In another embodiment, MPA program 121 determines the sufficient number of PWP conditions to evaluate based on the number of process parameters varied. For example, MPA program 121 may be configured with a table to determine the sufficient number of PWP conditions evaluated for each of a number of process parameters varied. In another example, MPA program 121 may be configured with a multiplier to use for determining the sufficient number of evaluations. In this case, if the multiplier configured in MPA program 121 is twenty and the number of process parameters being varied is four, then the sufficient number of evaluations would be eighty. If MPA program 121 determines that a sufficient number of PWP conditions have not been evaluated (decision block 316, "no" branch), then MPA program 121 returns to step 302 and determines additional PWP conditions for evaluation.

If MPA program 121 determines that sufficient PWP conditions have been evaluated (decision block 316, "yes" branch), then MPA program 121 determines the PWP conditions and the associated predicted process fail limit to send to a computing device (step 318). MPA program 121 identifies the PWP conditions to send to computing device, for example, to computer 130 using, or based on, the analysis of wafer feature measurement fails observed with respect to the associated measurement sigma for the process conditions used in forming the wafer feature on the test wafer. MPA program 121 may be configured by the user via UI 136 to determine the PWP conditions by one of several methods. In various embodiments, MPA program 121 determines the PWP conditions and the associated predicted process fail limits based on the proximity of the one or more fails with respect to the desired target sigma value. For example, the PWP condition and predicted fail limit may be determined based on the wafer feature size with one or more fails the closest to the desired target sigma value. In an embodiment, MPA program 121 determines the PWP conditions to send to the user on computer 130 by identifying the PWP conditions with the least number of fails for the measurement sigma values below the desired target sigma value. In one embodiment, MPA program 121 determines the PWP conditions to send to computer 130 by selecting the PWP conditions with the largest measurement sigma value for the observed fails that are closest to and above the desired target sigma value (i.e., PWP conditions with fails above and closest to the desired target sigma value). In another embodiment, the PWP conditions identified to send to computer 130 are based on an analysis of the wafer feature measurements for the fails with measurement sigma values below the desired target sigma value. For example, for each PWP condition, the largest wafer feature measurement for a fail with measurement sigma value below the desired target sigma value, the largest probable failing feature (LPFF), can be noted. In another embodiment, the PWP condition with the smallest LPFF may be identified to send to computer 130. Based on the determination of the PWP conditions in step 318, the wafer feature size associated with the determined PWP condition to send to computer 130 is determined by MPA program 121. The process fail limit is the wafer feature size associated with the determined PWP conditions. As known to one skilled in the art, the predicted fail limit may be based on either a wafer feature size that may be a minimum or a maximum wafer feature size depending on the wafer feature of interest. For example, for a wafer feature such as a line width, the appropriate wafer feature size for the predicted fail limit may be a minimum wafer feature size such as the smallest line width for the process fail limit sent to computer 130.

In various embodiments, the user reviewing the data sent from MPA program 121 including the determined PWP conditions from step 316, the predicted process fail limit and any fails for measurement sigma values below the desired target sigma values takes one or more actions. The user may choose to recommend the use of the determined PWP conditions with the proposed or predicted process fail limits. When the data received from MPA program 121 includes the determined PWP conditions and wafer feature sizes where fails occur at measurement sigma values below the desired target sigma value in the data sent to computer 130. In an embodiment, the wafer feature sizes sent to computer 130 by MPA program 121 are used to create design restrictions for the wafer feature sizes resulting in fails below the desired target sigma value in the test wafer evaluation. The wafer feature sizes for the identified PWP conditions associated with the predicted fail limit may be restricted from use or limited in semiconductor device designs using the manufacturing line that produced the test wafers. Alternatively, when fails occurs for each PWP condition evaluated, another evaluation may be run with another test wafer design.

While the method and the steps of MPA program 121 discussed are for an evaluation of wafer features, wafer feature sizes, and varied process parameters for a test wafer designed and built with a range of test pattern design and process variations, as known to one skilled in the art, the method and the steps of MPA program 121 may be used with evaluations of wafer features and process parameters for other semiconductor wafers (i.e., non-test wafers). Likewise, the method discussed determines the minimum wafer feature size that is unlikely to fail; while one skilled in the art will recognize that fail limits may apply to the largest feature size for some wafer features. In an embodiment, MPA program 121 analysis of wafer feature measurement for various wafer features and wafer feature sizes and various process parameters for a desired target sigma value is performed on production wafers or other wafer builds (non-test wafers).

FIG. 4 illustrates an example of a table 400 used in the calculation of a normalized process sigma as determined by MPA program 121 in accordance with an embodiment of the present invention. As depicted, FIG. 4 includes in the left column (column 410) the varied process parameters (i.e., focus in nm, dose in mJ, and mask size in nm) for a lithography process. From left to right the remaining columns illustrate an example of the expected variation for the process parameter (column 420), which may also be known as the manufacturing process variation standard deviation retrieved from manufacturing process database 126, the PWP condition (column 430), the process condition used in forming the test wafer feature measured (column 440), the process variation determined by MPA program 121 (column 450), and the process sigma or normalized variation (dimensionless) determined by MPA program 121 (column 460) for using the method as discussed in step 306. For example, using the three normalized process sigma values for focus, dose, and mask size as shown in FIG. 4, MPA program 121 combines the three process sigma values using a root sum square statistical analysis to determine a measurement sigma of 2.24.

Figure 5:
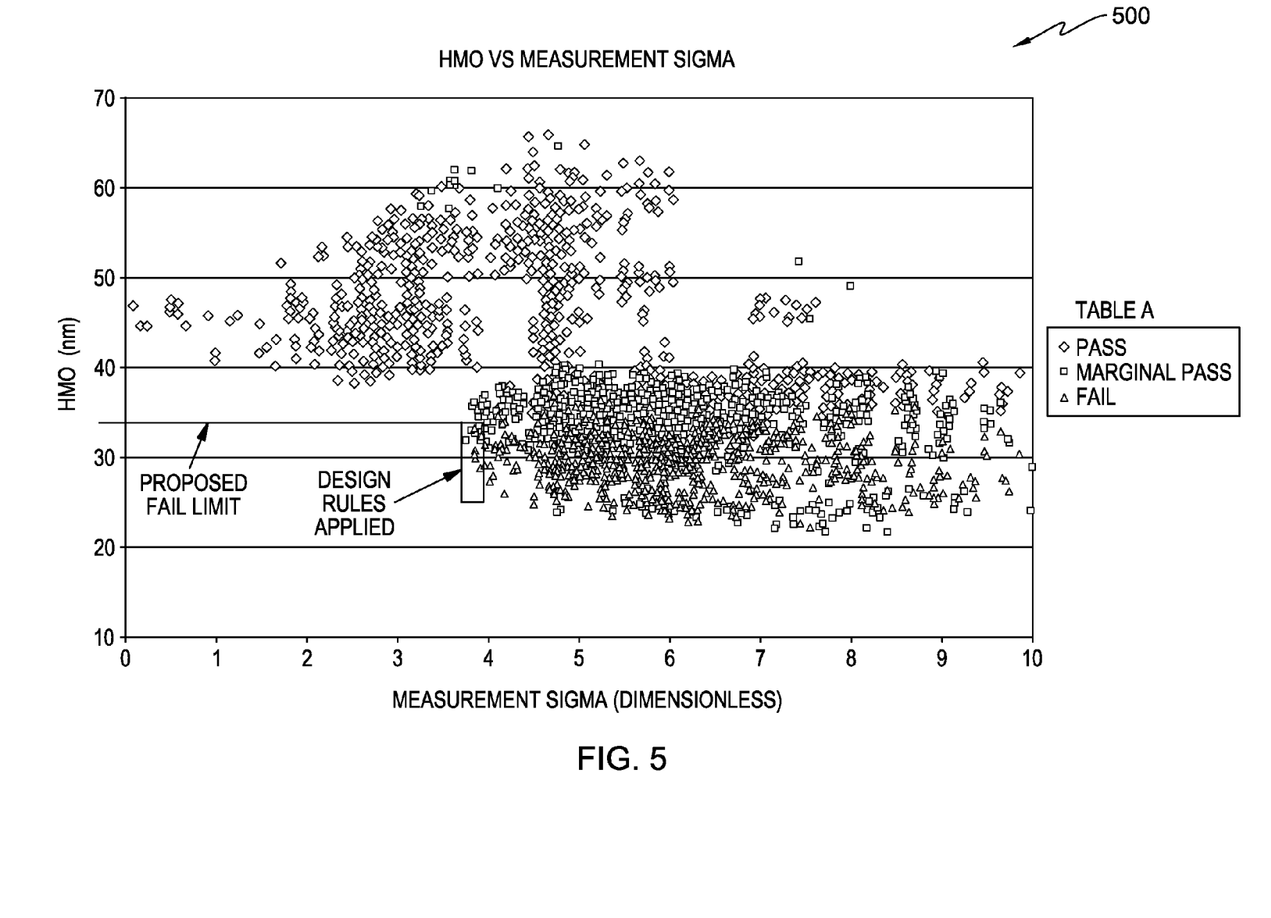
FIG. 5 illustrates an example of a plot of pass/fail data for wafer feature measurements with respect to corresponding measurement sigma values determined using the multiple process analysis program of FIG. 3, on the server computer within the distributed data processing environment of FIG. 1, in accordance with an embodiment of the present invention.

FIG. 5 illustrates an example of a plot 500 of pass/fail data for wafer feature measures respective to the corresponding measurement sigma values using MPA program 121, on server 120 within distributed data processing environment 100, in accordance with an embodiment of the present invention. As depicted in FIG. 5, HMO wafer feature pass/fail evaluations for each wafer feature measurement in nm (y-axis) are compared to the measurement sigma values determined for a PWP condition (x-axis). In this example, the measurement sigma values are determined from the process sigma values using an equal probability statistical analysis. As depicted in Table A, the wafer feature measurements evaluated as a pass are identified with diamonds, and wafer feature measurements nearing the wafer feature fail criteria (labeled marginal pass in Table A) identified with squares. The wafer feature measurements evaluated as fails are identified with triangles as depicted in Table A. In addition, identified on FIG. 5 is a proposed fail limit or a predicted fail limit based on MPA program 121 analysis of test wafer feature measurement evaluations (pass/fail), the determined measurement sigma for each measurement as compared to a target sigma for the manufacturing process. The target sigma in FIG. 5, or desired target sigma, is a four-sigma target for the measurement sigma value. In this example, the proposed fail limit is the smallest HMO size without a fail for the measurement sigma values equal to or below the desired target sigma value (e.g., four sigma for the measurement sigma). An area of wafer feature measurements evaluated as failing to meet acceptable criteria (e.g., acceptable wafer feature dimension) is identified by the box labeled "design rules applied". The wafer features such as a wafer feature shape, wafer feature size, wafer feature space or other wafer feature attribute for wafer features in this box may be restricted for use in semiconductor device design for the desired target sigma value on the manufacturing line building with the PWP conditions used in the evaluation.

Figure 6:
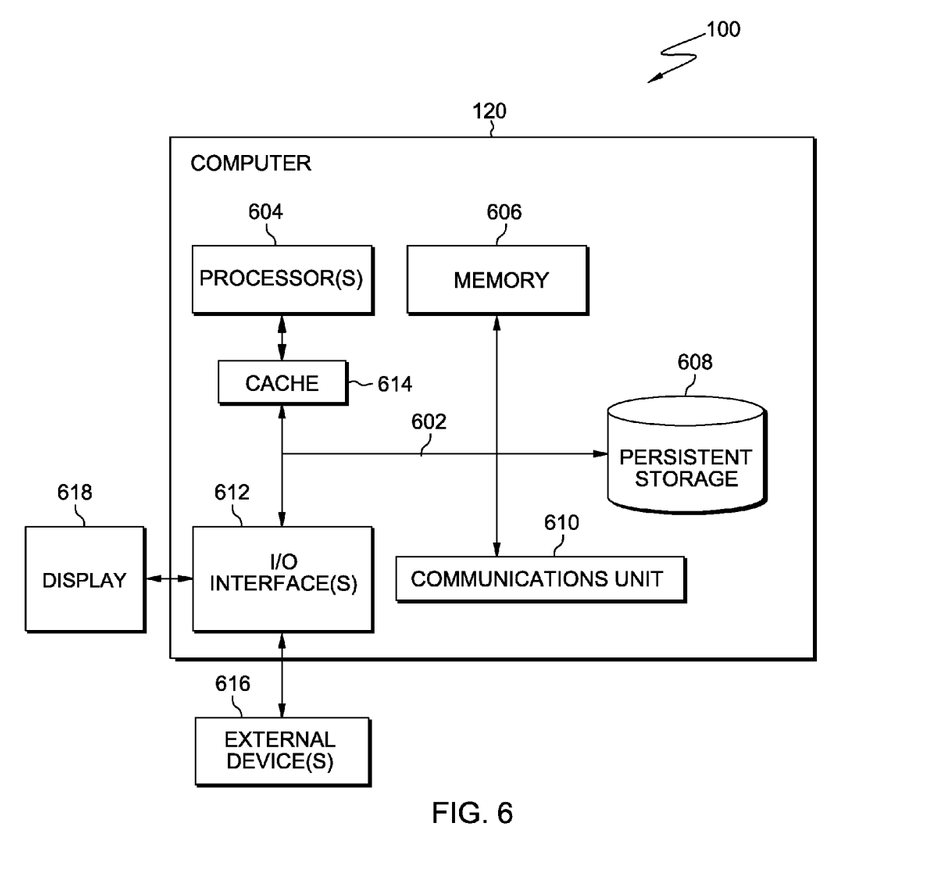
FIG. 6 depicts a block diagram of components of the server computer executing the multiple process analysis program within the distributed data processing environment of FIG. 1, in accordance with an embodiment of the present invention.

FIG. 6 depicts a block diagram of components of the server 120 and computer 130 executing MPA program 121 within distributed data processing environment 100, in accordance with an embodiment of the present invention. It should be appreciated that FIG. 6 provides only an illustration of one implementation and does not imply any limitations with regard to the environments in which different embodiments may be implemented. Many modifications to the depicted environment may be made.

Server 120 includes communications fabric 602, which provides communications between computer processor(s) 604, memory 606, persistent storage 608, communications unit 610, and input/output (I/O) interface(s) 612. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses.

Memory 606 and persistent storage 608 are computer readable storage media. In this embodiment, memory 606 includes random access memory (RAM). In general, memory 606 can include any suitable volatile or non-volatile computer readable storage media. Cache 614 is a memory that enhances the performance of processor(s) 604 by storing recently accessed data, and data near recently accessed data, from memory 606.

MPA program 121, test wafer measurement database 125, and manufacturing process database 126 can be stored in persistent storage 608 for execution and/or access by one or more of the respective computer processor(s) 604 via one or more memories of memory 606. In this embodiment, persistent storage 608 includes a magnetic hard disk drive. Alternatively, or in addition to a magnetic hard disk drive, persistent storage 608 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer readable storage medium that is part of persistent storage 608.

Communications unit 610, in these examples, provides for communications with other data processing systems or devices, including resources of distributed data processing environment 100, computer 130, and wafer measurement tool 140. In these examples, communications unit 610 includes one or more network interface cards. Communications unit 610 may provide communications through the use of either or both physical and wireless communications links. MPA program 121, test wafer measurement database 125, and manufacturing process database 126 may be downloaded to persistent storage 608 through communications unit 610.

I/O interface(s) 612 allows for input and output of data with other devices that may be connected to server 120. For example, I/O interface(s) 612 may provide a connection to external device(s) 618 such as a keyboard, keypad, a touch screen, and/or some other suitable input device. External devices 616 can also include portable computer readable storage media such as, for example, thumb drives, portable optical or magnetic disks, and memory cards. Software and data used to practice embodiments of the present invention, such as MPA program 121, test wafer measurement database 125, and manufacturing process database 126 can be stored on such portable computer readable storage media and can be loaded onto persistent storage 608 via I/O interface(s) 612. I/O interface(s) 612 also connects to a display 618. Display 618 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method of predicting a process fail limit for a semiconductor manufacturing process, the method comprising:
    building test wafers, the building of the test wafers comprising varying a plurality of process parameters during forming of a test wafer feature on each test wafer;
    acquiring a set of measurements for the test wafer feature on each of the test wafers using a wafer measurement tool;
    determining, using one or more computing devices, a potential working process condition for each of the plurality of process parameters;
    determining, using one or more computing devices, a process sigma value for each of the plurality of process parameters;
    determining, using one or more computing devices, a measurement sigma value from the process sigma value for each of the plurality of process parameters;
    evaluating, using one or more computing devices, the set of measurements of the test wafer feature compared to an acceptable wafer feature dimension, where each measurement of the set of measurements is evaluated as a pass or a fail as compared to the acceptable wafer feature dimension and stored in a test wafer measurement database;
    determining, using one or more computing devices, whether one or more fails are evaluated as compared to the acceptable wafer feature dimension for the set of measurements of the test wafer feature for measurement sigma values below a desired target sigma value; and
    responsive to determining one or more fails are evaluated, producing, using one or more computing devices, a predicted process fail limit based, at least in part, on the evaluated one or more fails, the measurement sigma value, and the desired target sigma value for the semiconductor test wafer build.

2. The method of claim 1, wherein the plurality of process parameters includes at least one of: a plurality of lithographic processes, a plurality of a non-lithographic processes, and a combination of one or more of the lithographic processes and one or more of the non-lithographic processes.

3. The method of claim 1, wherein the plurality of process parameters include one or more of a focus, a dose, a mask size, a source, an etch process, a deposition process, an implantation process, and a removal process.

4. The method of claim 1, wherein determining, using one or more computing devices, the measurement sigma value from the process sigma value for each of the plurality of process parameters comprises:
    determining, using one or more computing devices, a process variation for the test wafer feature formed by subtracting the potential working process condition for each process parameter from a process condition for each process parameter used to form the test wafer feature;
    retrieving, using one or more computing devices, an expected variation for each process parameter from a database;
    converting, using one or more computing devices, the process variation for the test wafer feature formed to the process sigma value by dividing the process variation by the expected variation for each process parameter; and combining, using one or more computing devices, the process sigma value for each of the plurality of process parameters using a statistical method to determine the measurement sigma value.

5. The method of claim 4, wherein the statistical method used in combining the process sigma value for each of the plurality of process parameters includes at least one of a root sum square statistical analysis and an equal-probability analysis.

6. The method of claim 1, wherein producing, using one or more computing devices, the predicted process fail limit includes identifying a wafer feature size associated with the predicted process fail limit and the potential working process condition for each of the plurality of process parameters.

7. The method of claim 1, wherein determining, using one or more computing devices, whether one or more fails are evaluated as compared to the acceptable wafer feature dimension for the set of measurements of the test wafer feature further comprises:
  responsive to determining no fails are evaluated as compared to the acceptable wafer feature dimension for the set of measurements of the test wafer feature for measurement sigma values below the desired target sigma value, producing, by one or more computer processors, a predicted process fail limit based, at least in part, on the evaluation of no fails, the measurement sigma value, and the desired target sigma value for the semiconductor test wafer build.

8. The method of claim 1, further comprises:
  responsive to determining one or more fails are evaluated as compared to the acceptable wafer feature dimension for measurement sigma values below a desired target sigma value, determining, using one or more computers, another potential working process condition for each of the plurality of process parameters;
  responsive to determining one or more fails are evaluated for the another potential working process condition, determining, using one or more computers, if a suitable number of potential working process condition for each of the plurality of process parameters has been evaluated; and
  responsive to determining a suitable number of potential working process conditions for each of the plurality of process parameters has been evaluated, producing, using one or more computer processors, the predicted process fail limit based on a proximity of the evaluated one or more fails with respect to the desired target sigma value.

9. The method of claim 8, further comprises determining, using one or more computer processors, whether one or more wafer feature sizes associated with the evaluated one or more fails for measurement sigma values below the desired target sigma are to be used to create a design restriction for the one or more wafer feature sizes.

10. A computer program product for predicting a process fail limit for a semiconductor manufacturing process, the computer program product comprising:
  one or more computer readable storage media and program instructions stored on the one or more computer readable storage media, the program instructions being executable by a processor, the program instructions comprising:
  program instructions to build test wafers, wherein building of the test wafers comprises varying a plurality of process parameters during forming of a test wafer feature on each test wafer;
  program instructions to acquire a set of measurements for the test wafer feature on each of the test wafers using a wafer measurement tool;
  program instructions to determine a potential working process condition for each of the plurality of process parameters;
  program instructions to determine a process sigma value for each of the plurality of process parameters;
  program instructions to determine a measurement sigma value from the process sigma value for each of the plurality of process parameters;
  program instructions to evaluate a set of measurements of the test wafer feature compared to an acceptable wafer feature dimension, where each measurement of the set of measurements is evaluated as a pass or a fail as compared to the acceptable wafer feature dimension and stored in a test wafer measurement database;
  program instructions to determine whether one or more fails are evaluated as compared to the acceptable wafer feature dimension for the set of measurements of the test wafer feature for measurement sigma values below a desired target sigma value; and
  responsive to determining one or more fails are evaluated, program instructions to produce a predicted process fail limit based, at least in part, on the evaluated one or more fails, the measurement sigma value, and a desired target sigma value for the semiconductor test wafer build.

11. The computer program product of claim 10, wherein the plurality of process parameters includes at least one of: a plurality of lithographic processes, a plurality of a non-lithographic processes, and a combination of one or more of the lithographic processes and one or more of the non-lithographic processes.

12. The computer program product of claim 10, wherein determining the measurement sigma value from the process sigma value for each of the plurality of process parameters further comprises:
  program instructions to determine a process variation for the test wafer feature formed by subtracting the potential working process condition for each process parameter from a process condition for each process parameter used to form the test wafer feature;
  program instructions to retrieve an expected variation for each process parameter from a database;
  program instructions to convert the process variation for the test wafer feature formed to the process sigma value by dividing the process variation by the expected variation for each process parameter; and
  program instructions to combine the process sigma value for each of the plurality of process parameters using a statistical method to determine the measurement sigma value.

13. The computer program product of claim 10, wherein program instructions to produce the predicted process fail limit include identifying a wafer feature size associated with the predicted process fail limit and the potential working process condition for each of the plurality of process parameters used to form the test wafer feature.

14. The computer program product of claim 10, wherein determining whether one or more fails are evaluated as compared to the acceptable wafer feature dimension for the set of measurements of the test wafer feature further comprises:
  responsive to determining no fails are evaluated as compared to the acceptable wafer feature dimension for the set of measurements of the test wafer features for measurement sigma values below the desired target sigma value, program instructions to produce a predicted process fail limit based, at least in part, on the evaluation of no fails, the measurement sigma value, and the desired target sigma value for the semiconductor test wafer build.

15. The computer program product of claim 10, further comprises:
responsive to determining one or more fails are evaluated as compared to the acceptable wafer feature dimension for measurement sigma values below a desired target sigma value, program instructions to determine another potential working process condition for each of the plurality of process parameters;
responsive to determining one or more fails are evaluated for the another potential working process condition, program instructions to determine if a suitable number of potential working process condition for each of the plurality of process parameters has been evaluated; and
responsive to determining a suitable number of potential working process condition for each of the plurality of process parameters has been evaluated, program instructions to produce the predicted process fail limit based on a proximity of the evaluated one or more fails with respect to the desired target sigma value.

16. A computer system for predicting a process fail limit for a semiconductor manufacturing process, the computer system comprising:
one or more computer processors;
one or more computer readable storage media;
program instructions stored on the one or more computer readable storage media for execution by at least one of the one or more processors, the program instructions comprising:
program instructions to build test wafers, wherein building of the test wafers comprises varying a plurality of process parameters during forming of a test wafer feature on each test wafer;
program instructions to acquire a set of measurements for the test wafer feature on each of the test wafers using a wafer measurement tool;
program instructions to determine a potential working process condition for each of the plurality of process parameters;
program instructions to determine a process sigma value for each of the plurality of process parameters;
program instructions to determine a measurement sigma value from the process sigma value for each of the plurality of process parameters;
program instructions to evaluate a set of measurements of the test wafer feature compared to an acceptable wafer feature dimension, where each measurement of the set of measurements is evaluated as a pass or a fail as compared to the acceptable wafer feature dimension;
program instructions to determine whether one or more fails are evaluated as compared to the acceptable wafer feature dimension for the set of measurements of the test wafer feature for measurement sigma values below a desired target sigma value; and
responsive to determining one or more fails are evaluated, program instructions to produce a predicted process fail limit based, at least in part, on the evaluated one or more fails, the measurement sigma value, and a desired target sigma value for the semiconductor test wafer build.

17. The computer system of claim 16, wherein program instructions to produce the predicted process fail limit include identifying the wafer feature size associated with the predicted process fail limit and the potential working process condition for each of the plurality of process parameters used to form the test wafer feature.

18. The computer system of claim 16, wherein determining the measurement sigma value from the process sigma value for each of the plurality of process parameters further comprises:
program instructions to determine a process variation for the test wafer feature formed by subtracting the potential working process condition for each process parameter from a process condition for each process parameter used to form the test wafer feature;
program instructions to retrieve an expected variation for each process parameter from a database;
program instructions to convert the process variation for the test wafer feature formed to the process sigma value by dividing the process variation by the expected variation for each process parameter; and
program instructions to combine the process sigma value for each of the plurality of process parameters using a statistical method to determine the measurement sigma value.

19. The computer system of claim 16, wherein determining whether one or more fails are evaluated as compared to the acceptable wafer feature dimension for the set of measurements of the test wafer feature further comprises:
responsive to determining no fails are evaluated as compared to the acceptable wafer feature dimension for the set of measurements of the plurality of test wafer features for measurement sigma values below the desired target sigma value, program instructions to produce a predicted process fail limit based, at least in part, on the evaluation of no fails, the measurement sigma value, and the desired target sigma value for the semiconductor test wafer build.

20. The computer system of claim 16, further comprises:
responsive to determining one or more fails are evaluated as compared to the acceptable wafer feature dimension for measurement sigma values below a desired target sigma value, program instructions to determine another potential working process condition for each of the plurality of process parameters;
responsive to determining one or more fails are evaluated for the another potential working process condition, program instructions to determine if a suitable number of potential working process condition for each of the plurality of process parameters has been evaluated; and
responsive to determining a suitable number of potential working process condition for each of the plurality of process parameters has been evaluated, program instructions to produce the predicted process fail limit based on a proximity of the evaluated one or more fails with respect to the desired target sigma value.

* * * * *